(12) United States Patent
Shrout et al.

(10) Patent No.: US 6,610,241 B2
(45) Date of Patent: Aug. 26, 2003

(54) MICROWAVE SINTERING OF MULTILAYER DIELECTRICS WITH BASE METAL ELECTRODES

(75) Inventors: Thomas R. Shrout, Port Matilda, PA (US); Dinesh Agrawal, State College, PA (US); Balasubramaniam Vaidhyanathan, Leicestershire (GB)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 09/825,465

(22) Filed: Apr. 3, 2001

(65) Prior Publication Data

US 2002/0162610 A1 Nov. 7, 2002

Related U.S. Application Data

(60) Provisional application No. 60/194,157, filed on Apr. 4, 2000.

(51) Int. Cl.[7] .............................................. C03B 33/32
(52) U.S. Cl. ..................... 264/432; 29/25.01; 29/25.02; 29/25.03; 156/89.18
(58) Field of Search .......................... 264/432; 29/25.01, 29/25.02, 25.03; 361/311, 313, 321.1, 321.2; 156/89.18

(56) References Cited

U.S. PATENT DOCUMENTS 5,481,428 A * 1/1996 Lauf et al. .................. 361/305
6,197,243 B1 * 3/2001 Tiegs et al. ................. 264/432

OTHER PUBLICATIONS

*Electroceramics: Materials Properties Applications*, by J.M. Herbert and A.J. Moulson, published by Chapman & Hall (1990), pages from chapter 5, (17 pages–incomplete chapter only pages 196+197 numbered).
pages from NOVACAP Technical Brochure presented with letter dated Oct. 24, 1988.

* cited by examiner

Primary Examiner—Christopher A. Fiorilla
(74) Attorney, Agent, or Firm—Konrad Raynes Victor & Mann, LLP; Alan S. Raynes (57) ABSTRACT

Certain embodiments relate to a process for forming a multilayer electrical device. The process includes providing a multilayer structure including layers of a dielectric material and an electrode material. The electrode material may include at least one material selected from the group consisting of nickel and copper. A variety of dielectric materials may be used, such as barium titanate. The method also includes sintering the dielectric material by heating the structure using microwaves in an industrial nitrogen atmosphere, which contains an oxygen partial pressure of $10^{-2}$ to $10^{-12}$ atm.

29 Claims, 7 Drawing Sheets

Capacitor Properties

| Cap | Loss | IR25 | DBS |
|---|---|---|---|
| 40nF | <0.01 | >200 G ohm | >1000 volts |

MICROWAVE SINTERING OF MULTILAYER DIELECTRICS WITH BASE METAL ELECTRODES

This application claims priority in U.S. Provisional Application No. 60/194,157 filed Apr. 4, 2000.

TECHNICAL FIELD

The present invention relates to forming multilayer electronic components using microwave radiation, and more particularly, certain embodiments relate to forming multilayer electronic components using microwave radiation in the presence of a partially reducing atmosphere.

BACKGROUND

Multilayer electronic devices such as capacitors typically include alternating layers of a dielectric material and a metal electrode material. In order to form a dense structure, the dielectric material is typically fired at high temperatures such as 1300–1400° C., in order to sinter the dielectric material. Due to the elevated temperatures needed to sinter the dielectric and the reactive nature of many metals, the metal electrodes are typically formed from palladium (Pd), palladium—silver (Pd—Ag) alloys, or platinum (Pt). Unfortunately, such electrode materials are expensive and drive up the cost of the components considerably.

Within the multilayer capacitor industry there is a desire to seek out alternative metal materials to lower the cost of the devices. For example, there is a trend to move toward base metal electrodes such as Ni or Cu replacing the more expensive Ag—Pd, Pd, and Pt inner electrode devices. With this change, many new processing steps and formulations are required to prevent the reduction of the properties of the ceramic material. When using the base metal inner electrodes, the sintering steps have been performed in atmospheres that prevent oxidation of the metal. However, this same atmosphere reduces the ceramics, creating atomic defects and a host of deleterious properties.

SUMMARY

Embodiments of the present invention include a process for forming a multilayer electrical device. The process includes providing a multilayer structure including layers of a dielectric material and an electrode material, the electrode material including at least one material selected from the group consisting of nickel and copper. The dielectric material is sintered by heating the structure using microwaves in an atmosphere having an oxygen partial pressure of no greater than $10^{-2}$ atm.

Embodiments also include a process for forming an electronic device including a dielectric material and at least one metal electrode. The process includes forming a structure including at least one layer of a base metal electrode material embedded between layers of dielectric material. The structure is microwave heated in an atmosphere containing oxygen at a pressure in the range of $10^{-2}$ to $10^{-12}$ atm, wherein the dielectric material is densified and the base metal electrode remains a metal after the microwave heating.

Embodiments also include a process for forming multilayer capacitors. The process includes providing a first layer of a dielectric material and a second layer of a electrode material including at least one metal selected from the group consisting of nickel and copper. The first and second layers are alternated to form a multilayer structure. The structure is microwave heated in an atmosphere including oxygen at a pressure of no greater than $10^{-2}$ atm to sinter the dielectric material.

BRIEF DESCRIPTION OF THE DRAWINGS

Embodiments of the invention are described with reference to the accompanying drawings which, for illustrative purposes, are schematic and not necessarily drawn to scale.

FIG. 2a illustrates an SEM photograph of a component including a $BaTiO_3$ based dielectric material with Ni electrodes that was sintered in a conventional furnace at the same relatively high partial pressure of oxygen that was used for the component of FIG. 1a.

DETAILED DESCRIPTION

Certain embodiments of the present invention relate to the use of microwave sintering to form dense multilayer ceramic components such as capacitors having nickel or copper based electrodes at relatively high partial pressures of oxygen. Certain preferred embodiments will be discussed in relation to FIGS. 1–6.

Figure 1A:
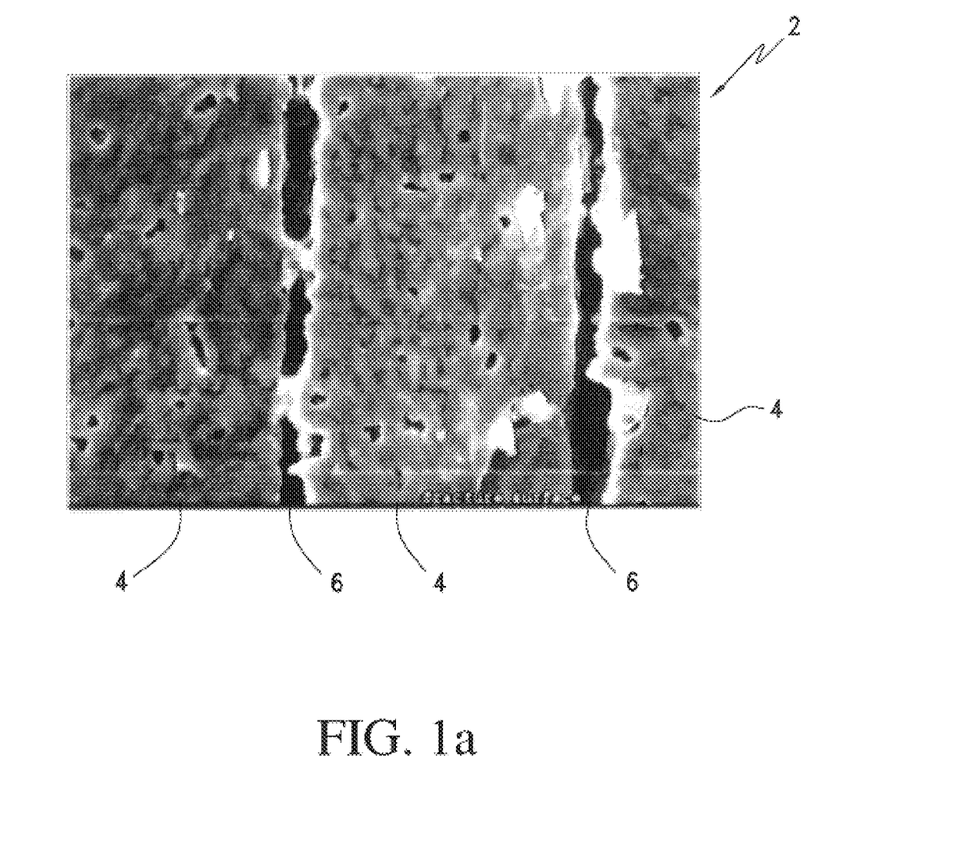
FIG. 1a illustrates a scanning electron microscope (SEM) photograph of a component including a $BaTiO_3$ based dielectric material with Ni electrodes that was sintered using microwave radiation in a relatively high partial pressure of oxygen according to an embodiment of the present invention.

FIG. 1a illustrates an SEM picture of a component 2 having a $BaTiO_3$ based dielectric (barium titanate) 4 which is engineered for low pressures of oxygen, with nickel (Ni) electrodes 6. The width of the electrode regions 6 is approximately 25 μm, and the picture was taken at a magnification of 1,800×. The component 2 was sintered in microwave radiation in an atmosphere of industrial nitrogen ($N_2$). Industrial nitrogen typically has a relatively high partial pressure of oxygen ($PO_2$) of about $10^{-3}$ to $10^{-6}$ atm. Measurements of the dielectric properties indicate that the $BaTiO_3$ based dielectric upon sintering was of the Z5U designation as known in the art.

Figure 6A:
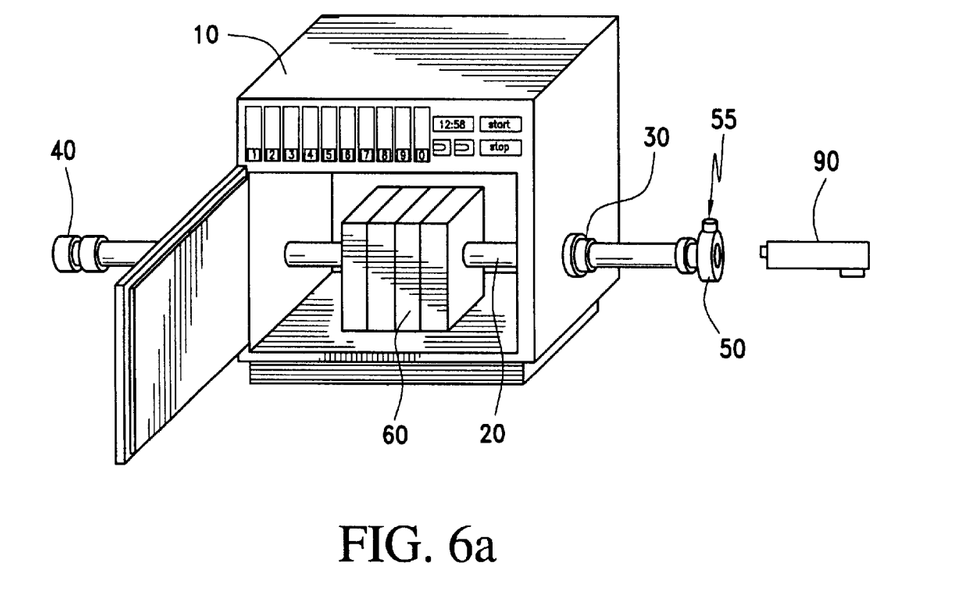
FIGS. 6a and 6b illustrates a processing system used to sinter components in accordance with an embodiment of the present invention.
Figure 6B:
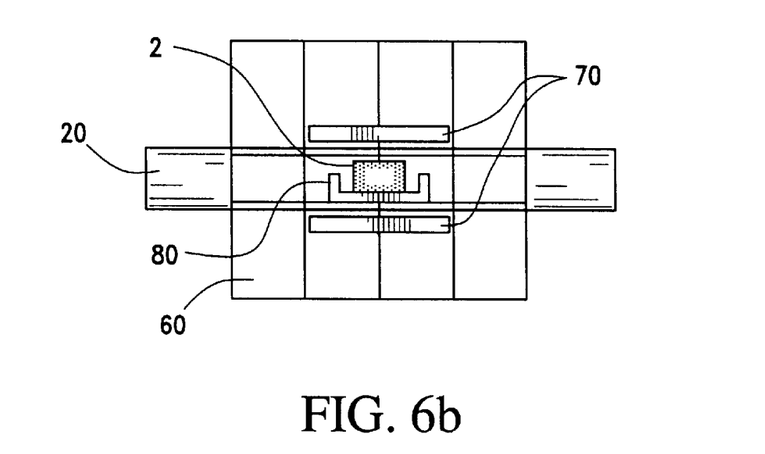

The component 2 was formed using a known processing system such as that shown in FIGS. 6a and 6b. FIG. 6a illustrates a side view of the system including a conventional microwave oven 10 through which a mullite tube 20 extends. A variety of microwave systems may be used, such as, for example, those having a frequency in the range of about 900 MHz to 85 GHz. FIG. 6b illustrates a crosssectional view of the interior of the oven 10 and the interior of the tube 20.

A 2.0 kW commercial microwave oven (Amana Radarange, model RC/20SE) with 2.45 GHz multimode cavity was used to sinter MLC samples. The microwave oven 10 was set up to keep the external body temperature of the oven close to the ambient by circulating cold water through a copper tube (not shown) fixed at the top and the sides of the double jacketed oven. The mullite tube 20 was positioned at the center of the oven, by drilling holes on the side faces, with the ends projecting on both sides. The mullite tube 20 was supported mechanically by fixing two aluminum tubes with flanges 30 from inside to provide support at the two ends. The aluminum flange interface with the side faces was sealed from inside using an aluminum foil for avoiding any microwave leakage. Stainless steel tube joint 40 is located on one side of the oven 10, and a double t-joint 50 through which forming gas 55 may be flowed is located on the other side of the oven 10.

A mullite based insulation package made from Fiberfrax® boards 60 was used to surround the mullite tube 20 in the center of the oven 10 for containing the heat from dissipation during sintering. Though not required, in certain embodiments a susceptor or secondary coupler, SiC rods 70, may be inserted inside the insulation. In this case no susceptor rods were used because barium titanate is good microwave absorber.

The component 2 was placed at the center of the tube 20 in an aluminum oxide boat 80 and the power to the oven 10 was controlled manually using a standard variac controller. A flowing industrial nitrogen atmosphere was used during heating of the samples. The temperature of the sample was monitored using an infrared pyrometer 90 (Raytek, Marathon Series) with the circular cross-wire focused on the sample cross-section. The infrared pyrometer was integrated to a dedicated personal computer for accessing the temperature data as a function of time. The temperature was also measured using a conventional optical pyrometer (Leeds and Northrup) as a reference and in case of any temperature discrepancy; the latter was used as the correct temperature.

Figure 1B:
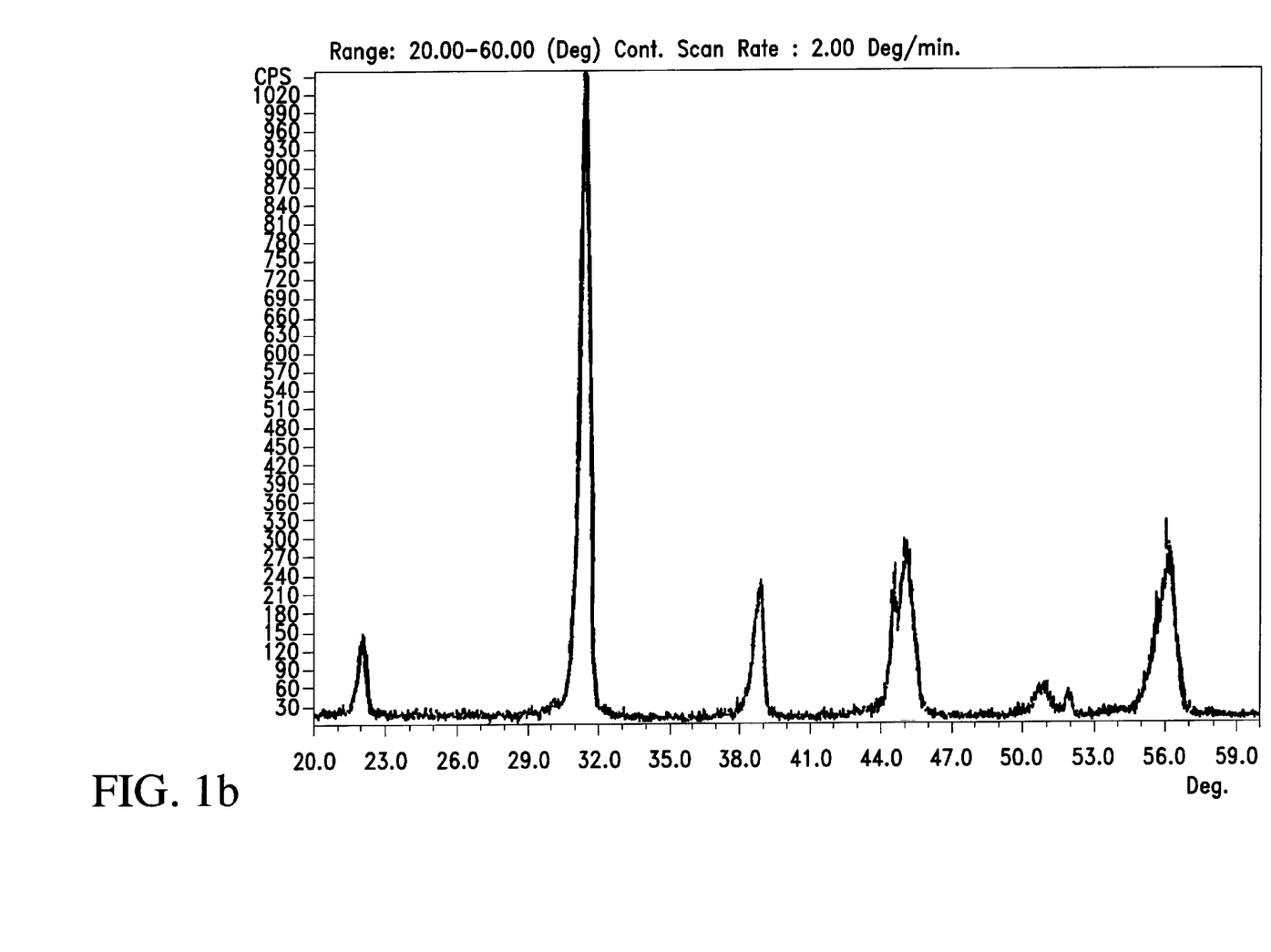
FIG. 1b illustrates a graph of a powder x-ray diffraction pattern of the component of FIG. 1a showing the presence of Ni and $BaTiO_3$.

FIG. 1b shows an x-ray diffraction pattern of the component of FIG. 1a. The pattern shows peaks corresponding to nickel in metal form and perovskite barium titanate. As seen in FIG. 1a, the component has sintered into a dense structure and the electrodes remained in metal form and did not oxidize during the sintering process. This example illustrates that base metal electrodes can be used while microwave sintering in an inexpensive processing gas having a relatively high partial pressure of oxygen, such as $10^{-2}$ to $10^{-6}$ atm. In certain embodiments, processing gases having a wide range of oxygen partial pressures may be utilized, with oxygen partial pressures being in the range of, for example, $10^{-2}$ to $10^{-12}$ atm.

Figure 2A:
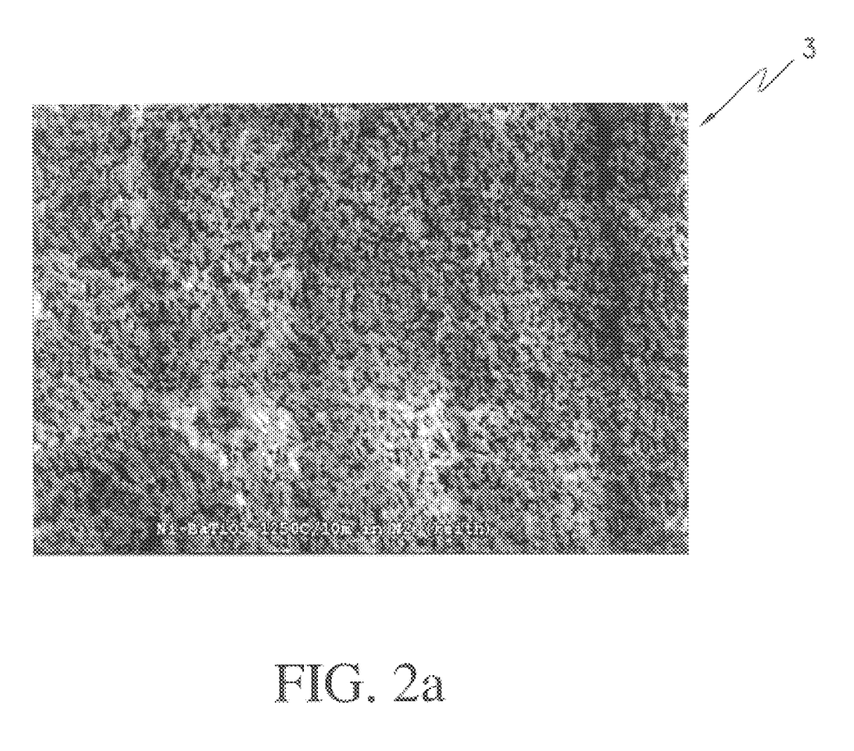
Figure 2B:
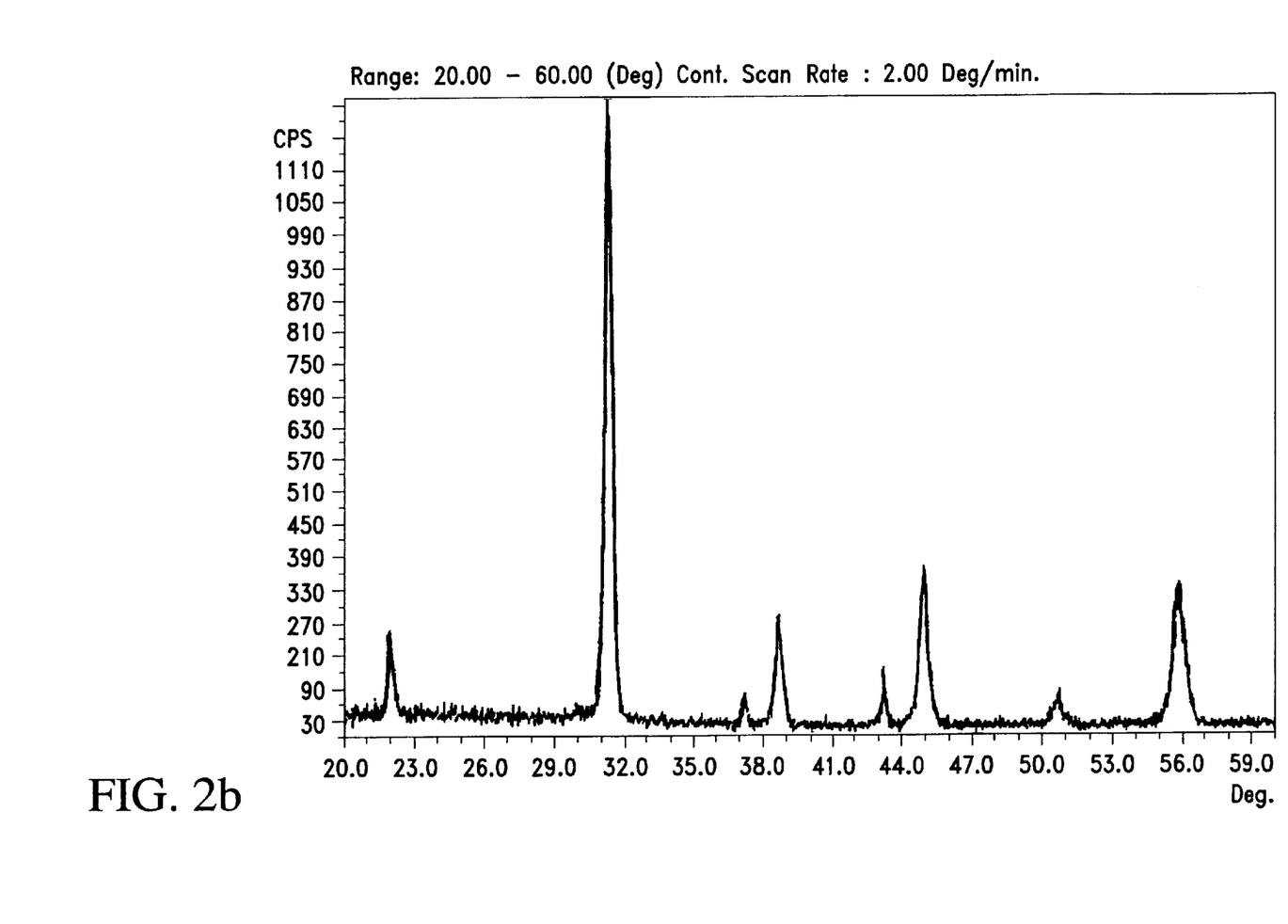
FIG. 2b illustrates a graph of a powder x-ray diffraction pattern of the component of FIG. 2a showing the presence of the oxidation product of the Ni.

FIGS. 2a and 2b illustrate a component 3 having the same green structure (barium titanate based composition and nickel electrode material) that was fired in the same atmosphere as used for the component in FIGS. 1a and 1b, but was fired in a conventional (non-microwave) furnace. As seen in the SEM picture of FIG. 2a, the component 3 shows a lack of densification and the electrode material oxidized. The picture in FIG. 2a was taken at a magnification of 800×. FIG. 2b illustrates an x-ray diffraction pattern for the component 3, and indicates the presence of nickel oxide (NiO).

In another example of an embodiment of the present invention, multilayer components having barium titanate dielectric and copper (Cu) electrodes were microwave sintered in a manner similar to that described above for the barium titanate dielectric and nickel electrode components discussed above. Similar results were obtained, with the electrode material remaining in metal form and the dielectric becoming densified.

In another example of an embodiment of the present invention, multilayer components having a LTCC (low temperature co-fired ceramic) dielectric material using copper electrodes were microwave sintered in an industrial nitrogen atmosphere using a set up such as that described above. An LTCC dielectric is typically a glass ceramic including a zinc borate glass and a filler material such as aluminum oxide, that can be sintered at a low firing temperature of less than about 900° C. In this example the component was fired at 750° C. One example of an LTCC material is sold by DuPont under the designation 951. For the LTCC components, once again the electrode material remained in metal form with no discontinuities and the dielectric became densified.

A variety of dielectric materials in addition to those described above may be used in embodiments of the present invention. Dielectric materials which may be used include, but are not limited to those known in the industry as Z5U, NPO, Y5F, Y5U, Y5V, X7R, X8R and COG.

Figure 3:
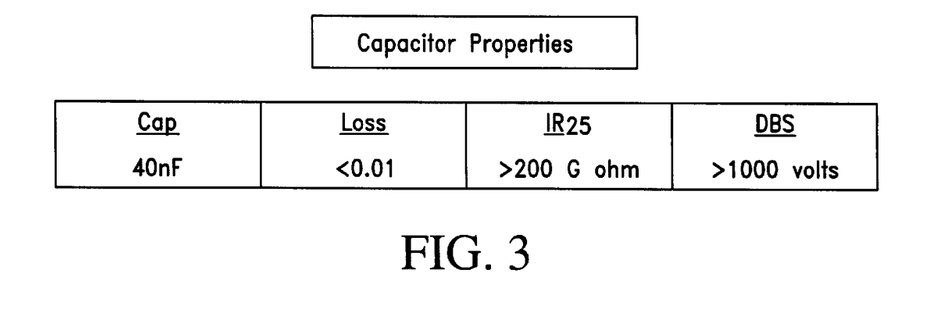
FIG. 3 shows capacitor properties including capacitance, dielectric loss, insulation resistance at 25° C., and dielectric breakdown strength (DBS) for a base metal multilayer capacitor microwave sintered in accordance with an embodiment of the present invention.
Figure 4:
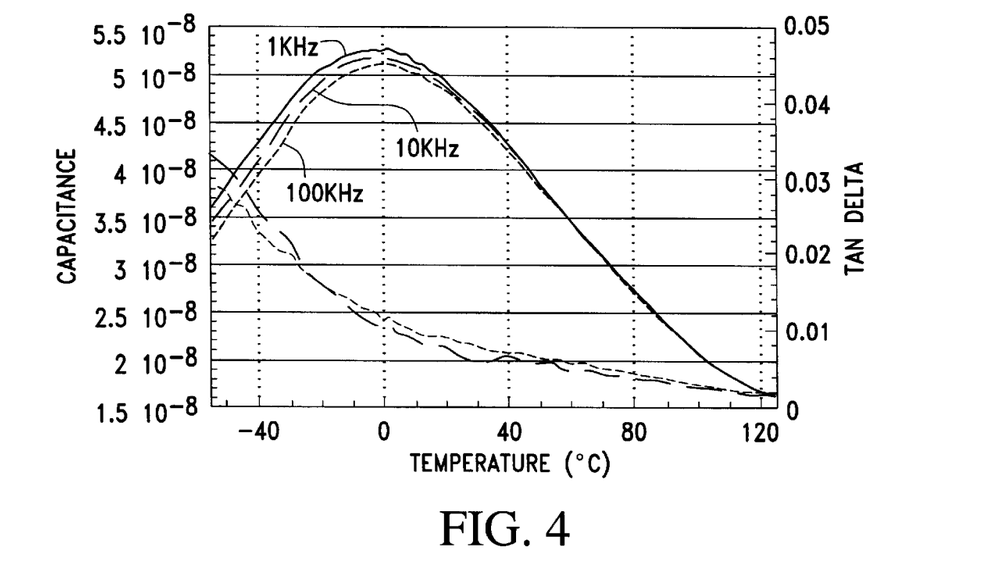
FIG. 4 illustrates a graph including the capacitance and dielectric loss as a function of temperature for a base metal multilayer capacitor formed in accordance with an embodiment of the present invention.
Figure 5:
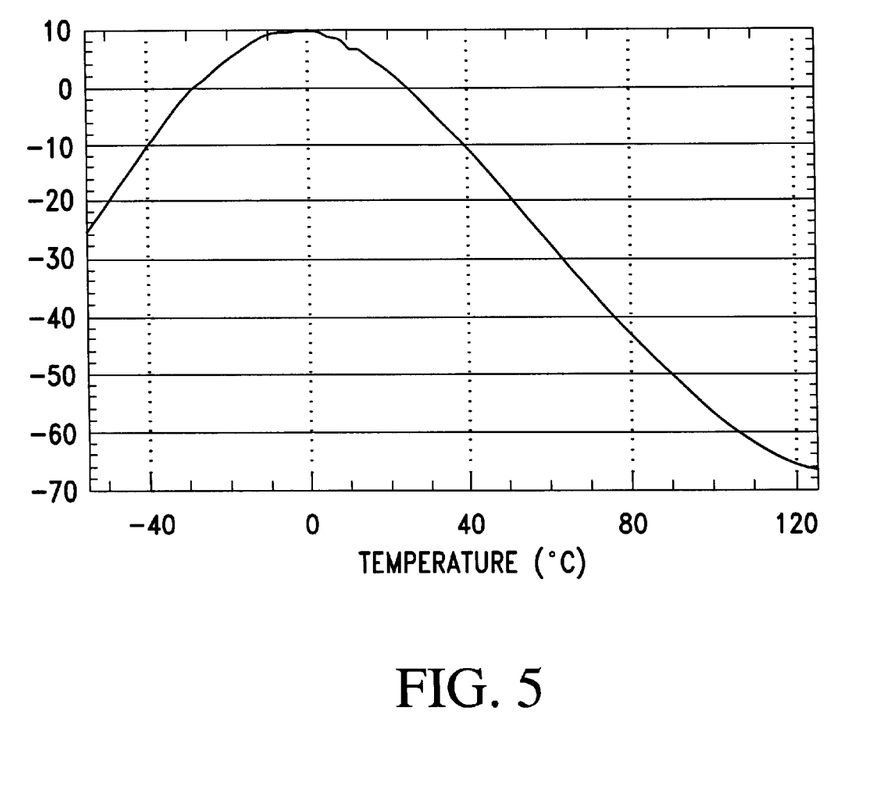
FIG. 5 illustrates a graph including the temperature coefficient of capacitance as a function of temperature for a multilayer capacitor formed in accordance with an embodiment of the present invention.

FIG. 3 provides capacitor properties for a multilayer capacitor fired using microwave sintering at 1250° C. for 30 minutes in industrial nitrogen. The capacitor had a $BaTiO_3$ based dielectric material and nickel base metal electrodes. The capacitance was 40 nF, the dielectric loss less than 0.01, and insulation resistance at 25° C. was greater than 200 G ohm, and the dielectric breakdown strength was greater than 1000 volts. FIG. 4 shows a graph illustrating the capacitance as a function of temperature, measured at a number of frequencies as indicated on the graph, including 1 kHz, 10 kHz, and 100 kHz. FIG. 4 also illustrates the dielectric loss (tan delta) as a function of temperature, also measured at a number of frequencies. The data from FIG. 4 was used to calculate the temperature coefficient of capacitance (%) as a function of temperature, which is shown in the graph of FIG. 5. The data from this graph fits the profile of a Z5U material as known in the art.

Embodiments of the present invention permit the processing of multilayer components such as capacitors to be carried out in a relatively high oxygen content atmosphere while using base metal electrode materials such as nickel, copper, alloys including these materials, and the like. Preferred processing conditions include microwave sintering at a temperature in the range of about 900–1320° C. for BaTiO3 and nickel electrodes, about 750–1000° C. for barium titanate and copper electrodes, and about 750–950° C. for an LTCC dielectric and copper electrodes. In certain embodiments it is preferred to sinter in a partially reducing atmosphere. A partially reducing atmosphere will have a partial pressure of oxygen that is less than the oxygen content in air. In certain embodiments, the upper limit of the oxygen content in the processing gas may depend on several factors, including the composition of the dielectric and electrode materials, the microwave power and wavelength, and the presence of gases that react with oxygen. The process can be controlled so that the kinetics drive the process to permit the sintering of the dielectric and the electrode to take place prior to oxidation. Some examples of preferred partially reducing atmospheres include industrial nitrogen and industrial nitrogen mixed with other gases such as hydrogen or carbon monoxide. Other gas compositions are also possible.

The preparation of the components including initial formation of the multilayer green bodies to be sintered in the microwave chamber may be carried out using known casting and printing methods such as processes in which binders are mixed with the dielectric, layers of dielectric and electrode are formed on top of each other and pressed and diced, and the binders are burned off prior to sintering.

Certain embodiments of the present invention have been found to have a number of advantages. It has been found that microwave sintering enhances the densification of the dielectric and can be carried out at lower temperatures with microwave heating than with conventional furnace heating. The microwave sintering appears retard oxidation in the densification stage. In addition, the use of relatively high oxygen partial pressures will allow the use of low cost microwave furnaces for manufacturing of multilayer electronic devices such as capacitors. Current practice often employs costly atmospheric furnaces to precisely control low $PO_2$ (~$10^{-10}$) atmosphere, in order to prevent oxidation of the nickel or copper electrode. In addition, it is typical practice in the multilayer ceramic industry to process base metal devices to have an annealing step to lower the total oxygen vacancy concentration. This may be eliminated, therefore lowering the loss and simplifying manufacturing.

It will, of course, be understood that modifications of the present invention, in its various aspects, will be apparent to those skilled in the art. For example, while the use of a multimode microwave process is described above, other types of microwave processing methods, such as single mode processing as known in the art, may also be utilized. Embodiments may also utilize microwave processing with base metal electrodes at very low oxygen partial pressures. Other embodiments are possible, their specific features depending upon the particular application.

What is claimed:

1. A process for forming a multilayer electrical device, comprising:
   providing a multilayer structure including layers of a dielectric material and an electrode material, the electrode material comprising at least one material selected from the group consisting of nickel and copper; and
   sintering the dielectric material by heating the structure using microwaves in an atmosphere having an oxygen partial pressure of no greater than $10^{-2}$ atm.

2. A process as in claim 1, wherein the oxygen pressure is in the range of $10^{-2}$ to $10^{-12}$ atm.

3. A process as in claim 2, wherein the atmosphere comprises a partially reducing gas.

4. A process as in claim 3, wherein the atmosphere comprises industrial nitrogen.

5. A process as in claim 3, wherein the atmosphere comprises nitrogen and oxygen.

6. A process as in claim 3, wherein the atmosphere comprises nitrogen, oxygen and at least one gas selected from hydrogen and carbon monoxide.

7. A process as in claim 1, wherein the dielectric material comprises a $BaTiO_3$ based composition.

8. A process as in claim 1, wherein the dielectric material comprises a low temperature co-fired ceramic material.

9. A process as in claim 1, wherein the dielectric material comprises a glass and ceramic composite.

10. A process as in claim 1, wherein the dielectric comprises barium titanate and the electrode material comprises nickel, and wherein the sintering is carried out at a temperature in the range of 900° C. to 1320° C.

11. A process as in claim 1, wherein the dielectric comprises barium titanate and the electrode material comprises copper, and wherein the sintering is carried out at a temperature in the range of 750° C. to 1000° C.

12. A process as in claim 1, wherein the dielectric comprises a glass ceramic composite and barium titanate, the electrode material comprises nickel, and the sintering is carried out at a temperature in the range of 750° C. to 950° C.

13. A process as in claim 1, wherein the device is a capacitor.

14. A process as in claim 1, wherein the oxygen partial pressure is approximately $10^{-3}$ to $10^{-6}$ atm.

15. A process as in claim 1, wherein the dielectric material after sintering possesses the properties of a material selected from the group consisting of Z5U, NPO, Y5F, Y5U, Y5V, X7R, X8R and COG.

16. A process as in claim 1, wherein the electrode material comprises nickel.

17. A process as in claim 1, wherein the electrode material comprises copper.

18. A process for forming an electronic device including a dielectric material and at least one metal electrode, comprising:
   forming a structure including at least one layer of a base metal electrode material embedded between layers of dielectric material; and
   microwave heating the structure in an atmosphere containing oxygen at a pressure in the range of $10^{-2}$ to $10^{-12}$ atm, wherein the dielectric material is densified and the base metal electrode remains a metal after the microwave heating.

19. A process as in claim 18, wherein the base metal electrode is formed from at least one material selected from the group consisting of nickel, copper, and alloys including at least one of nickel and copper.

20. A process as in claim 18, wherein the microwave heating is carried out in a mixed mode field.

21. A process as in claim 18, wherein the base metal electrode comprises nickel and the dielectric material comprises a $BaTiO_3$ based formulation heated at about 1150–1300° C. for 1 to 60 minutes in industrial nitrogen.

22. A process as in claim 18, wherein the microwave heating is carried out using a frequency in the range of 900 MHz to 85 GHz.

23. A process as in claim 18, wherein the microwave heating sinters the electrode material and sinters the dielectric material.

24. A process for forming multilayer capacitors, comprising:
   providing a first layer of a dielectric material;
   providing a second layer of a electrode material including at least one metal selected from the group consisting of nickel and copper;
   alternating the first and second layers to form a multilayer structure; and
   microwave heating the multilayer structure in an atmosphere including oxygen at a pressure of no greater than $10^{-2}$ atm to sinter the dielectric material.

25. A process as in claim 24, further comprising mixing the dielectric layer with at least one binder material prior to providing the first layer of the dielectric material, and heating the multilayer structure to remove the binder prior to the microwave heating to sinter the dielectric material.

26. A process as in claim 24, wherein the atmosphere comprises nitrogen and oxygen, wherein the oxygen is present at a partial pressure in the range of $10^{-3}$ to $10^{-6}$ atm.

27. A process as in claim 24, wherein the dielectric material comprises a $BaTiO_3$ based composition and the microwave heating to sinter the material is carried out at a temperature in the range of 1150° C. to 1300° C.

28. A process as in claim 24, wherein the oxygen partial pressure is greater than $10^{-12}$ atm.

29. A process as in claim 24, wherein the microwave heating sinters the electrode material.

* * * * *

UNITED STATES PATENT AND TRADEMARK OFFICE
CERTIFICATE OF CORRECTION

PATENT NO. : 6,610,241 B2  Page 1 of 1
APPLICATION NO. : 09/825465
DATED : August 26, 2003
INVENTOR(S) : Thomas R. Shrout et al.

It is certified that error appears in the above-identified patent and that said Letters Patent is hereby corrected as shown below:

Column 1, Line 7, after related applications, and before "TECHNICAL FIELD" insert the following:

--GOVERNMENT SPONSORSHIP

This invention was made with support from the Government under NSF Grant No. EEC9616250. The Government has certain rights in the invention.--

Signed and Sealed this

Fifteenth Day of January, 2008

JON W. DUDAS
*Director of the United States Patent and Trademark Office*